Figure 1:
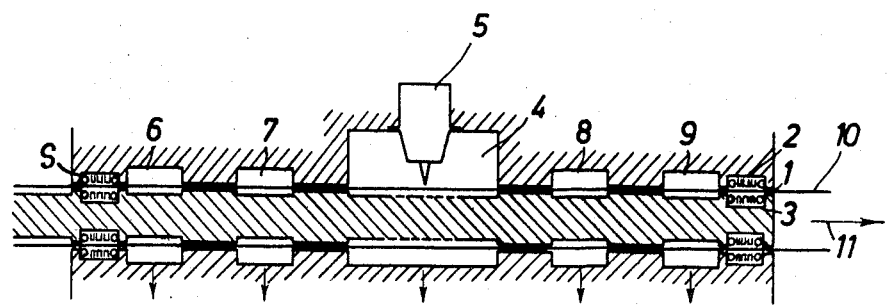

United States Patent
Long

[15] 3,643,058
[45] Feb. 15, 1972

[54] DEVICE FOR CONTINUOUS TREATMENT OF ARTICLES

[72] Inventor: Jacques Long, Annecy, France

[73] Assignee: Societe Alsacienne de Constructions Atomiques de Telecommunications et d'Electronique Alcatel, Paris, France

[22] Filed: Dec. 29, 1969

[21] Appl. No.: 888,566

[30] Foreign Application Priority Data

Dec. 26, 1968 France....................................180656

[52] U.S. Cl. ...........................................219/121 EB, 277/34
[51] Int. Cl. ...........................................B23k 9/00
[58] Field of Search...............277/4, 5, 34, 27; 34/242, 92; 68/5; 219/121, 121 EB, 69; 73/389; 137/820; 324/33

[56] References Cited

UNITED STATES PATENTS

| 3,058,057 | 10/1962 | Frost | 324/33 |
| 3,348,447 | 10/1967 | Goleb | 250/41.9 |
| 3,438,259 | 4/1969 | Bossert | 324/33 |
| 3,032,890 | 5/1962 | Brick et al. | 34/92 |
| 3,212,408 | 10/1965 | Randol | 91/369 |
| 3,426,173 | 2/1969 | Steigerwald | 219/121 |
| 3,435,185 | 3/1969 | Gerard | 219/121 |
| 3,440,390 | 4/1969 | McCullough et al. | 219/121 |

Primary Examiner—R. F. Staubly
Assistant Examiner—Gale R. Peterson
Attorney—Craig, Antonelli and Hill

[57] ABSTRACT

Device for continuous treatment of a workpiece, having an essentially constant and possibly complex cross section, providing means for passing the workpiece within an advancing passage defined by two opposite walls having an appropriate cross section and widening at particular points so as to form successively at least one input chamber, one treating chamber, and at least one output chamber, in that order, and means for supplying and maintaining predetermined pressures in said chambers, including regulating means for constantly regulating the pressure and the composition of the atmosphere prevailing in the treating chamber by regulating the opening of the advancing passage at the inlet and outlet sides, respectively, of said input and output chambers.

9 Claims, 2 Drawing Figures

DEVICE FOR CONTINUOUS TREATMENT OF ARTICLES

The present invention relates to a method and to a device for the continuous treatment under pressure and at controlled atmosphere of metallic workpieces, or the like, an essentially constant profile.

The various prior art devices for continuous treatment in vacuo or at controlled atmosphere, such as welding by electronic bombardment, metallization, and thermal treatment in vacuo, comprise in general an envelope whose tightness with respect to the ambient air is assured either by means of a band attached to the piece to be treated, or by means of joints made from elastomeric material, for example. A device of this type has been described notably in French Pat. No. 1,311,413.

There exist devices, however, which are designed particularly for welding by electronic bombardment in which the workpieces to be welded are not maintained in vacuo, but in which the electron beam may operate in the free air, or more often a confined atmosphere after having passed through a series of envelopes at staged pressures separated from each other by means of diaphragms which are provided with a small hole for passage.

All of these devices have a certain number of drawbacks. In the devices which comprise joints for purposes of tightness, one of these drawbacks results from the fact that the joints being used are rapidly worn out because of the friction between the movable parts and possibly by the flux of heat emitted as a result of the treatment which is carried out. It is therefore necessary to effect frequent exchanges of these joints, which leads to frequent and prolonged stoppage of the entire treating device.

Another drawback stems from the fact that the devices of this type do not allow for stability of the pressure prevailing within the treating chamber. Particularly in the case of welding by electronic bombardment, the variations of focusing of the beam resulting from variations in pressure in the treating chamber lead to welding seams having a certain heterogeneity and poor mechanical properties.

A still further drawback results from the fact that the known devices only permit the treatment of either plane or annular workpieces, such as bands and cylinders, and that they are found to be adaptable only with great difficulty, if not altogether unusable, for the operations of treating workpieces which are more complex in configuration, such as profiled pieces, elbows or angle irons, or the like.

It is the primary object of the present invention to eliminate these disadvantages and drawbacks and to propose a device which renders it possible to obtain workpieces whose treatment is perfectly regular and homogeneous, and which further displays excellent properties, such workpieces having an essentially constant profile but also being either simple or complex configurations.

The present invention relates to the continuous treatment, at controlled atmosphere maintained at a pressure different from atmospheric pressure, workpieces having an essentially constant profile, which is characterized in that it consists in causing the workpieces to be treated—which has an essentially constant cross section and may be complex—to pass within an advancing passage defined by two oppositely disposed walls having an appropriate cross section and widening so as to form successively at least one input chamber or gate, one treating chamber and one output chamber or gate, maintaining predetermined pressures within these chambers, regulating constantly the pressure and the composition of the atmosphere prevailing in the treating chamber by constantly comparing the pressure and the gaseous composition of the input chamber or gate and the output chamber or gate with reference values, and acting constantly upon the pressure prevailing in these chambers and/or on the size of the advancing passage determining the flow thereof as well as upon the values serving for the admission of gas to the chambers.

The present invention further relates to and is concerned with a device for carrying out the method outlined above.

Figure 2:
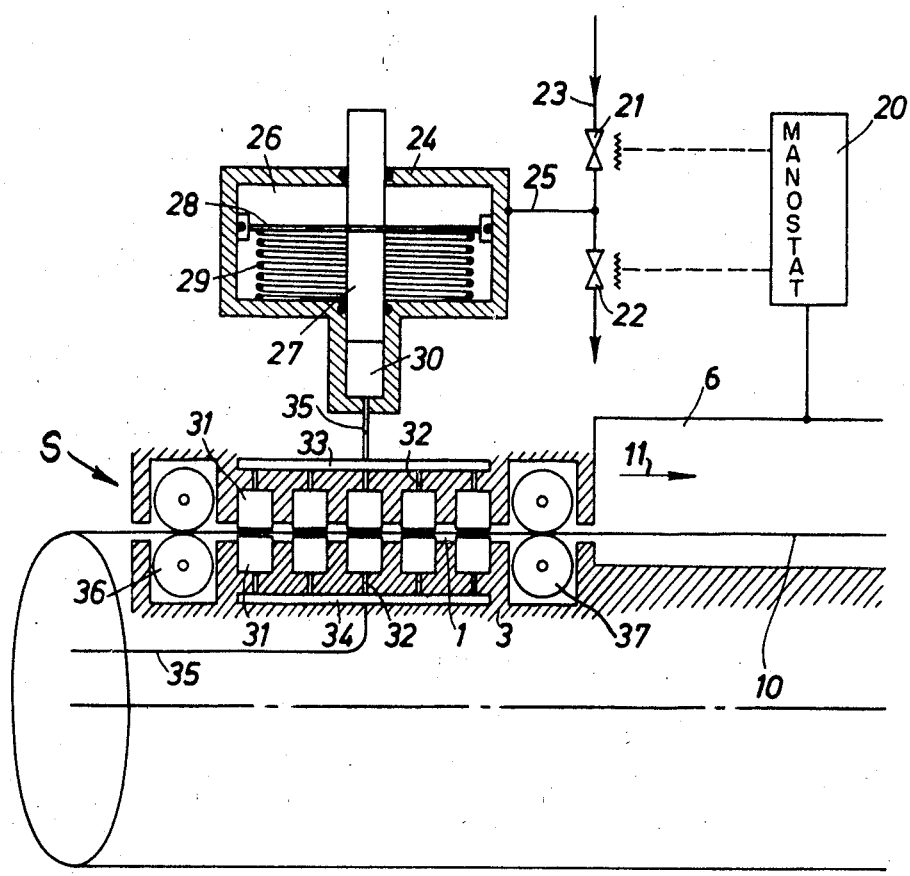

One embodiment of such a device, applied to welding by electronic bombardment, will now be further described hereinbelow by way of example and without being limitative in any way, and the description thereof is taken in connection with the accompanying drawing, wherein FIG. 1 is a longitudinal cross-sectional view of a continuous welding device according to the present invention which is designed for welding tubular workpieces, and FIG. 2 is a partial cross-sectional view of a device for the automatic regulation of pressure which may be used with the device of FIG. 1.

FIG. 1 illustrates one specific embodiment of a device proposed by the present invention designed for the continuous welding of tubes having relatively significant manufacturing irregularities, this device comprising essentially a cylindrical advancing passage 1 which is delimited by an external wall 2 and an internal wall 3. This passage terminates in a welding chamber 4 which is equipped with an electron gun 5 disposed in the central portion thereof, one annular entry chamber or gate 6, one annular output chamber or gate 9, as well as annular chambers or gates 7 and 8, which are positioned along this passage 1 symmetrically with respect to the welding chamber 4. The welding chamber 4 is linked to a first pumping unit (not shown) whereas the chambers of locks 7 and 8 and the chambers or locks 6 and 9 are connected respectively to further pumping units (not shown). The pressures prevailing in the chambers 6 and 9 which are most remote from the welding chamber 4 are intermediate between the pressures of the chambers 7 and 8 and atmospheric pressure, and the pressures of the chambers 7 and 8 are intermediate between those of the welding chamber 4 and the pressures of the chambers 6 and 9.

It has been assumed for purposes of explanation that the procession or advance of the tube 10 is effected, for example, in the direction of the arrow 11 by means of sets of driven rollers.

The device according to the present invention as described hereinabove operates in the following manner: After setting or placing the pumping sources and the electron gun 5 to work, the advance of the tube 10 within the passage 1 is assured by means of sets of rollers, which will be further described hereinbelow with reference to FIG. 2. The welding operation is thus effected continuously due to the electron beam emitted by the gun 5, while the fluid pressure prevailing in the pumping chamber is retained constant with the aid of means for regulating the pressure, one embodiment of which is illustrated in FIG. 2.

FIG. 2 illustrates one of the devices for the automatic regulation of the pressure, and this device comprises essentially a manostat 20 connected to the input chamber or gate 6 immediately adjacent the regulating device for detecting variations in the pressure within the chamber 6. This manostat 20 may control two electrovalves in accordance with the detected pressure as compared to a standard pressure, one electrovalve 21 serving for filling purposes, and one discharge electrovalve 22, being supplied from a fluid source (not shown) by way of a duct or line 23, and communicating with a hydraulic control valve 24 by way of a duct or line 25.

The hydraulic control valve 24 consists of a first cylinder 26 within which there may slide two integral pistons 27 and 28, a spring 29 being interposed between the piston 28 and the lower side or cheek of the cylinder 26. Disposed at the height of this lower side or cheek is a second cylinder 30 enclosing or containing a liquid. The latter cylinder 30 is coaxial with respect to the piston 27 which has the same diameter and which extends thereinto.

Positioned within the walls 2 and 3 of the conduit 1 are deformable toric membranes 31 known per se, which are connected by means of ducts or lines 32 to annular collectors 33 and 34 communicating with the second cylinder 30 of the hydraulic control valve 24 by means of conduits such as 35. Furthermore, FIG. 2 represents the tube 10 to be welded and whose guide and mechanical centering within the passage 1 are assured by means of a set of input rollers 36 and by a set of output rollers 37.

This device operates in the following manner: When the pressure in the input chamber or gate 6 exceeds the desired pressure, the manostat 20 emits an information signal which controls the opening of the filling electrovalve 21 and the supply of fluid into the cylinder 26 of the hydraulic control valve 24. The piston 28 entrains or guides the piston 27 to which it is connected downwardly and the latter causes an increase in the volume of the deformable membranes 31 by compressing the liquid contained within the cylinder 30 of the hydraulic control valve 24. The increase in volume of the membranes 31 leads to a decrease in the size of the advancing passage 1 determining the flow thereof, i.e., it regulates the "-fluid conveyability" of the passage, and consequently to a decrease of the pressure within the chamber or input gate 6, to the posted value.

Conversely, when the pressure in the chamber or input gate 6 is lower than the desired pressure, the manostat 20 emits an information signal which controls the opening of the discharge electrovalve 22 of the cylinder 26 of the hydraulic control valve 24. The spring 29 guides the pistons 28 and 27 upwardly, and the latter piston 27 causes a decrease in the volume of the deformable membranes 31 by means of a reduction of the pressure of the liquid contained in the cylinder 30 of the hydraulic control valve 24. The decrease in volume of the membranes 31 leads to an increase in the size of the passage 1 and consequently to an increase in the pressure in the chamber or input gate 6, up to the posted value, and so forth.

A regulating device which is identical to the one described above is connected to the chamber or output gate 9, and disposed between this chamber and the end of the passage 1.

The method and the device described hereinabove have or afford a plurality of advantages. First of all, despite the variations in the fluid conveyability of the walls of the advancing passage 1 resulting in variations in the flow therethrough that are caused by the variations of the manufacturing tolerances and surface conditions, the pressure is kept scrupulously constant and equal to the posted value. It is thus apparent that the treatment which is carried out is perfectly regular and homogeneous and permits the obtaining of workpieces having excellent properties.

Another advantage afforded by the present invention resides in the fact that the preservation of the pressure requires only a limited number of chambers or gates. Such a device is therefore not very cumbersome and has a moderate cost of manufacture.

A further advantage of the present invention results from the fact that the group of deformable membranes disposed within the advancing passage of the workpieces cooperates with this passage in order to produce a so-called "grooved" flow whose greater efficacy in the case of turbulent and viscous flow systems assures a better pumping output.

According to a further advantage of the present invention, this device does not require the setting in operation of friction joints whose tightness is frequently found to be imperfect and which become unserviceable rapidly due to friction.

In accordance with still another advantage of the present invention, this device makes possible the treatment of workpieces having different and complex shapes, such as profiled or sectional workpieces, and the like, the sole transformation to be made consisting in adapting the cross section of the advancing passage of the workpiece to the cross section of the latter.

It is understood that it is possible, jointly with the use of the pressure-regulating device shown in FIG. 2, to act directly upon the pressure prevailing in the chambers or gates. One may likewise employ this single embodiment for regulation of the pressure by causing the manostat 20 to control, for example, either the filling or the discharge of these chambers or gates.

Finally, it is apparent that the present invention is by no means limited to the embodiment described and illustrated herein but encompasses equally any modifications thereof. For example, the pressure-regulating device shown in FIG. 2 may be replaced by an equivalent system which carries out the same regulation, particularly with respect to the control valve and the two controlling electrovalves thereof.

What I claim is:

1. Device for the continuous treatment of a workpiece having an undefined length and an essentially constant cross section by treating means within a treating chamber maintained under a controlled atmosphere and at a pressure different from atmospheric pressure, comprising:

means for advancing the piecework to be treated through said treating chamber including parallel walls defining therebetween a narrow space forming a passage having an appropriate cross section corresponding to the shape and cross section of the workpiece to be treated, said passage extending to and from said treating chamber, and guide rollers for effecting movement of said workpiece through said passage, means for insulating the treating chamber from the atmosphere consisting of at least one input chamber and at least one output chamber disposed symmetrically with respect to the treating chamber along said passage, said input and output chambers being positioned at an equal distance from said treating chamber and being kept at essentially identical pressures, and pumping means including respective pumping sources connected to each of said input and output chambers for maintaining said chambers at a desired pressure, modifying means for modifying the fluid conveyability of said passage, comparing means for comparing the pressure prevailing in the input chamber and in the output chamber with respect to a predetermined reference pressure and for delivering first and second signals according to the algebraic difference between said pressures and the reference pressure, means for adjusting the pressure in the input chamber and in the output chamber as a function of said first and second signals including electrovalve means controlled by said comparing means for regulating the fluid supply from the respective pumping sources to said chambers, said means for modifying the fluid conveyability of said passage being actuated in response to control by said electrovalve means.

2. A device according to claim 1, in which said means for modifying the fluid conveyability of said passage consists of toric membranes made from an elastomeric material which are deformable by the application of fluid pressure thereto to adjust the size of said passage.

3. A device according to claim 2, in which the means for modifying the fluid conveyability of said passage through deformation of the toric membranes further includes a hydraulic control valve controlled by said electrovalve means for regulating the application of fluid pressure to said toric membranes.

4. A device according to claim 2, in which said means for comparing the pressure prevailing in the input chamber and in the output chamber with respect to a predetermined reference pressure consists of a manostat.

5. A device according to claim 3, wherein said electrovalve means includes first and second electrovalves connected in series to a fluid source and opened by said first and second signals, respectively, in response to detection of pressure greater and less than said reference pressure, said hydraulic control valve being connected between said first and second electrovalves so that the operation thereof is controlled by the pressure derived from said electrovalves.

6. A device according to claim 1, wherein said modifying means is provided in connection with said passage at the input and output sides of said input and output chambers, respectively.

7. A device for continuous welding by electron bombardment of a workpiece having an undefined length and an essentially constant cross section, comprising a welding chamber including an electron gun and a pumping source connected to said welding chamber for maintaining said welding chamber at a reduced pressure, means for advancing the workpiece to be welded through said welding chamber including two oppositely arranged walls defining therebetween a narrow space forming a passage, insulating means disposed along said passage and traversed by the workpiece which is being welded in the form of input and output chambers disposed symmetrically with respect to said welding chamber at the input and output thereof, including a plurality of deformable toric membranes positioned in said passage adjacent each of said input and output chambers and a pumping source for providing fluid pressure for said membranes, and regulating means responsive to pressure variations in said chambers for controlling the pressure supplied to said membranes to thereby control the fluid conveyability of said passage at the sides of said input and output chambers forming the input and output of the device.

8. A device as defined in claim 7, wherein said means for advancing the workpiece includes at least one pair of driven guide rollers in driving engagement with said workpiece.

9. A device as defined in claim 7, wherein said regulating means includes hydraulic control valves regulating the pressure supplied to said deformable membranes in response to variations in pressure in said chambers.

* * * * *